United States Patent [19]
Hitomi et al.

[11] Patent Number: 5,590,626
[45] Date of Patent: Jan. 7, 1997

[54] RECIPROCATING ENGINE OF A SPARK IGNITION TYPE

[75] Inventors: Mitsuo Hitomi; Shunji Masuda; Toshihiko Hattori; Kenji Kashiyama; Junsou Sasaki, all of Hiroshima-ken, Japan

[73] Assignee: Mazda Motor Corporation, Hiroshima, Japan

[21] Appl. No.: 481,839

[22] Filed: Jun. 7, 1995

Related U.S. Application Data

[62] Division of Ser. No. 345,344, Nov. 21, 1994, Pat. No. 5,445,123, which is a continuation of Ser. No. 936,001, Aug. 27, 1992, abandoned.

[30] Foreign Application Priority Data

Aug. 27, 1991 [JP] Japan ..................... 3-240607

[51] Int. Cl.$^6$ ...................................... F01L 7/00
[52] U.S. Cl. ........................................ 123/90.15
[58] Field of Search ............... 123/90.15, 90.16, 123/90.17, 90.18, 316, 527, 261, 48 R, 48 AA

[56] References Cited

U.S. PATENT DOCUMENTS

| | | | |
|---|---|---|---|
| 4,250,852 | 2/1981 | Kerimov et al. | 123/261 |
| 4,484,543 | 11/1984 | Maxey | 123/90.15 |
| 4,635,609 | 1/1987 | Seppen et al. | 123/527 |
| 5,025,757 | 6/1991 | Larsen | 123/48 R |
| 5,341,771 | 8/1994 | Riley | 123/48 AA |
| 5,443,050 | 8/1995 | Hitomi | 123/90.15 |

Primary Examiner—Marguerite McMahon
Attorney, Agent, or Firm—Fish & Richardson P.C.

[57] ABSTRACT

A spark ignition type reciprocating engine of a natural intake system with an ignition plug arranged to face a combustion chamber defined and delimited by a piston inserted into a cylinder so as to move in a reciprocating way, which has:

a bore size of the cylinder ranging from approximately 45 mm to 67 mm;

a volume of a single chamber of the cylinder ranging from approximately 110 cc to 340 cc;

a ratio of a stroke of the piston to the bore size of the cylinder being larger than 1; and a compression ratio of the engine being 11 or larger.

17 Claims, 15 Drawing Sheets

(VALB TIMING IN REGION I)

(VALB TIMING IN REGION II)

(VALB TIMING IN REGION III)

RECIPROCATING ENGINE OF A SPARK IGNITION TYPE

This application is a division of U.S. application Ser. No. 08/345,344, filed Nov. 21, 1994, now U.S. Pat. No. 5,445,123, which is a continuation of Ser. No. 07/936,001, filed Aug. 27, 1992, now abandoned.

BACKGROUND OF THE INVENTION

1. Field of the Invention

The present invention relates to a reciprocating engine of a spark ignition type and, more particularly, to a spark ignition type reciprocating engine of a natural intake system with ignition plugs disposed so as to face combustion chambers of the engine.

2. Description of the Related Art

Among engines of a natural intake system, i.e. internal combustion engines without superchargers, spark ignition type reciprocating engines are loaded on many automobiles, each of which is provided with ignition plugs so as to face the combustion chambers defined and delimited by the pistons inserted into the cylinders so as to be movable in a reciprocating way. It is well known that the engines of this type can provide better heat efficiency as a compression ratio becomes larger.

It can be noted, however, that there is the tendency that knocking becomes likely to occur when a larger compression ratio is set. For conventional engines except for engines so adapted as to be suitable for use with a so-called high-octane gasoline having a large octane value, a compression ratio ($\epsilon$) is set at largest to $\epsilon$=about 10.

SUMMARY OF THE INVENTION

Therefore, the object of the present invention is to provide a spark ignition type reciprocating engine of a natural intake system so adapted as to set a compression ratio larger than a conventional compression ratio while preventing knocking from occurring.

In order to achieve the aforesaid object, the present invention consists of a spark ignition type reciprocating engine of a natural intake system with an ignition plug disposed so as to face a combustion chamber defined and delimited by a piston inserted into a cylinder so as to be movable in a reciprocating manner, wherein the compression ratio of the engine is set to 11 or over ($\epsilon \geq 11$) and wherein a diameter of a bore of the cylinder (hereinafter referred to briefly as "the bore size") ranges from approximately 45 mm to 67 mm; a volume of a single chamber of the cylinder ranges from approximately 110 cc to 340 cc; and a ratio of a stroke of the piston, S, to the diameter of the bore of the cylinder, B, is set to a value larger than 1.

When the problem with knocking is solved the compression ratio of the engine must be set to 11 or over ($\epsilon \geq 11$), it is found effective that the bore size of the cylinder is set to the smallest possible size to shorten the distance over which flames develop and expand and in order to improve anti-knocking performance.

Two limitations are considered when making the bore size smaller. First, there is a reliability limitation related to the speed of the piston as it moves through the cylinder. Second, a limit results from a rapid increase in the resistance to intake air due to choking associated with the shortening of a valve size of an intake valve. Hence, the bore size is set to the smallest diameter within a range that satisfies these two limits. Selection of a bore size that satisfies the two limits will now be described.

Limit upon reliability (the speed of the piston):

A mean speed of the piston Um (mm per second) can be represented by the formula (1) as follows:

$$Um = (N/30) \times S$$

where N is the speed of rotation of the engine in rpm; and S is the stroke of the piston in millimeters.

A limit value of the mean speed of the piston, Um, is usually 20 m/s (Um=$2.0 \times 10^4$ mm per second).

Thus, the formula (1) above can give the stroke of the piston by substituting $2.0 \times 10^4$ mm/s for Um and the maximum speed of rotation of the engine for N.

Limit from resistance to intake air (choking):

It is generally known that resistance to intake air increases rapidly when a mean intake air mach number, Mim, becomes Mim=0.5, thereby decreasing volume efficiency rapidly.

The mean intake air mach number, Mim, can be represented by the following formula (2) as follows:

$$Min = \frac{Vh \times (\eta_v/100)}{a \times Fim(e) \frac{(\theta_{IC} - \theta_{IO})}{6N}}$$

where

Vh is the volume of the single chamber as represented in cc;

$\eta_v$ is the efficiency in volume as represented in %;

a is the sonic speed as represented in cm per second;

$\theta$ is the angle of a crank as represented in deg, CA. ATDC;

$\theta_{IC}$ is the timing for closing the intake valve;

$\theta_{IO}$ is the timing for opening the intake valve;

N is the speed of rotation of the engine as represented in rpm;

Fi is the area of the opening of the intake valve as represented in cm$^2$; and

Fim(e) is the mean area of the opening of the intake valve as represented in cm$^2$.

The mean area of the opening of the intake valve, Fim(e), can be represented by the formula (3) as follows:

$$Fim(e) = Fia(e)/(\theta_{IC} - \theta_{IO})$$

where Fia(e) is the effective angular area of the intake valve.

Then, the effective angular area of the intake valve, Fia(e), can be represented by the formula (4) as follows:

$$Fia(e) = \int_{\theta_{IO}}^{\theta_{IC}} \mu_i \cdot (\theta) \times Fi(\theta) d\theta$$

where Fi is the area of the opening of the intake valve.

FIG. 18 shows the result of computation on the effective angular area of the intake valve, Fia(e), for the internal combustion engine having two intake valves and two exhaust valves for each cylinder, provided that the result of the computation is based on the assumption as follows:

(a) the two intake valves have the same valve sizes;

(b) the two exhaust valves have the same valve sizes; and (c) a ratio of an area of the intake valve to an area of the exhaust valve at their throat portions is 1.5 to 1.

Further, the conditions for computing the effective angular area of the opening of the intake valve, Fia(e), are as follows:

(1) the distance between the valve seat of the first intake valve and the valve seat of the second intake valve is 2.5 mm or over;

(2) the distance between the valve seat of the intake valve and the valve seat of the exhaust valve is 3.5 mm or over;

(3) the distance between the valve seat of the first exhaust valve and the valve seat of the second exhaust valve is 4.0 mm or over;

(4) the distance between the valve seat of the intake valve and an ignition plug is 2.5 mm or over;

(5) the distance between the valve seat of the exhaust valve and the ignition plug is 3.5 mm or over;

(6) the valve seat may come into contact with a peripheral portion of the bore of the cylinder;

(7) the angle between the valves is 30°;

(8) the combustion chamber is of a penthouse type;

(9) the diameter of the plug is 14 mm;

(10) the diameter of a stem is 6 mm;

(11) the diameter of the throat portion=the diameter of the valve seat minus 5 mm;

(12) the length of a valve lift is 8.5 mm; and

(13) the timing for opening the valve is 256 deg CA.

The relation between the bore size and the volume of the single chamber, which satisfy the two limits as have been described hereinabove, will be considered in the procedures as will be described hereinafter.

Procedure 1: The stroke of the piston can be given from the formula (1) above when the speed of rotation of the engine is determined, which reaches Um=20 m/s ($2.0 \times 10^4$ mm per second) that is the limit value of the mean speed of the piston, Um. Further, the volume of the single chamber for each of the bore sizes can be given on the basis of the given stroke of the piston. FIG. 19 indicates the relation of the bore size with the volume of the single chamber that reaches Um=$2.0 \times 10^4$ mm per second; in FIG. 19, the one-dot-and-dash lines indicate the volumes of the single chamber corresponding to each of the bore sizes when the speeds of rotation of the engine are varied by each 1,000 rpm in the range from 5,000 rpm to 8,000 rpm.

Procedure 2: The volumes of the single chamber, which reach the mean intake air mach number Min=0.5 with respect to each bore size, are given from the formulas (1) to (4) above and the result of computation on the effective angular area of the intake valve Fia(e). In FIG. 19, the solid lines indicate the volumes of the single chamber given in Procedure 2 for every 1,000 rpm of the speed of rotation of the engine in the range from 5,000 rpm to 8,000 rpm.

Procedure 3: A description will be made of the relation between the speed of rotation of the engine that results in the mean speed of the piston being Um=20 m/s ($2.0 \times 10^4$ mm per second), hereinafter referred to as "the speed of rotation of the engine $N_{20}$", and the speed of rotation of the engine that results in the mean intake air mach number Mim=0.5, hereinafter referred to as "the speed of rotation of the engine $N_{0.5}$".

(1) If the speed of rotation of the engine $N_{0.5}$ is larger than the speed of rotation of the engine $N_{20}$, the bore size is set so as to allow a sufficient amount of the intake air to enter up to a speed higher than the limit upon reliability as described hereinabove. Hence, this is to the contrary of the original purpose that the bore size should be made smaller, so that the speed of rotation of the engine $N_{0.5}$ should be equal to or smaller than the speed of rotation of the engine $N_{20}$.

(2) It can be noted that the speed of rotation of the engine that produces the maximum horse power is generally set to the speed of rotation of the engine lower by approximately 1,000 rpm than the limit upon reliability.

It should be noted, however, that, if the speed of rotation of the engine becomes higher than the speed of rotation of the engine $N_{0.5}$, a flow of intake air per unit time does not increase, so that an axial output of the engine does not increase or it is decreased to a large extent at the speed of rotation of the engine which is equal to or higher than the speed of rotation of the engine $N_{0.5}$.

From the foregoing, it can be said that the point that produces the maximum horse power exists at the speed of rotation of the engine slower than the speed of rotation of the engine $N_{0.5}$.

For example, if the difference between the speed of rotation of the engine $N_{0.5}$ and the limit upon reliability would exceed 2,000 rpm ($N_{20} - N_{0.5} > 2,000$), the horse power does not increase, or it is reduced, in a region where the speed of rotation of the engine is higher by 2,000 rpm or more than the speed of rotation of the engine at which the maximum horse power is produced. Hence, this case is not good so that the speed of rotation of the engine $N_{0.5}$ and the speed of rotation of the engine $N_{20}$ should satisfy the relation that satisfies $N_{20} - N_{0.5} \leq 2,000$ rpm.

(3) When the characteristics of the engine are to be set in the same manner as conventional engines, it is preferred that the speed of rotation of the engine that produces the maximum horse power should be set to larger than 6,000 rpm. Hence, the speed of rotation of the engine $N_{0.5}$ should be set to larger than 6,000 rpm.

(4) In order to ensure the predetermined volume in the single chamber and to minimize the bore size, it is necessary to place a limit upon the stroke of the piston. However, it is not desirable to minimize the bore size by shortening the stroke of the piston to an extent that results in the speed of rotation of the engine significantly exceeding the speed of rotation of a conventional engine. Hence, the speed of rotation of the engine $N_{20}$ should be set to 8,000 rpm or slower.

All the conditions given in the procedures as have been described hereinabove are described in FIG. 19. As shown in FIG. 19, the hatched area indicates an area wherein the engine having two intake valves and two exhaust valves for each cylinder meets the relation of the bore size vs. the volumes of the single chamber, which satisfies the aforesaid two limits. Hence, it is found from FIG. 19 that the bore size ranges from approximately 51 mm to 67 mm and the volume of the single chamber ranges from approximately 150 cc to 340 cc.

Likewise, a review has been made of the engine having three intake valves and two exhaust valves for each cylinder under the same procedures as have been described hereinabove. As shown in FIG. 19, the cross-hatched area indicates an area that meets the relation of the bore sizes with the volumes of the single chamber, which satisfies the two limits as have been described hereinabove. It is found from FIG. 19 that the bore size ranges from approximately 45 mm to 50 mm and the volume of the single chamber is in the range of from approximately 110 cc to 200 cc.

From the foregoing results, the range in which the bore size can be minimized is from approximately 45 mm to 67 mm and the range in which the predetermined volume of the single chamber can be ensured is from approximately 110 cc to 340 cc.

Further, it should be noted that a ratio of the stroke of the piston, S, to the bore size of the cylinder, B, is larger than one, i.e. S/B>1. In other words, the engine has a long stroke and the bore size is made smaller in order to ensure the same volumes in each of the single chambers. This arrangement can minimize a load upon a bearing of a crank shaft.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
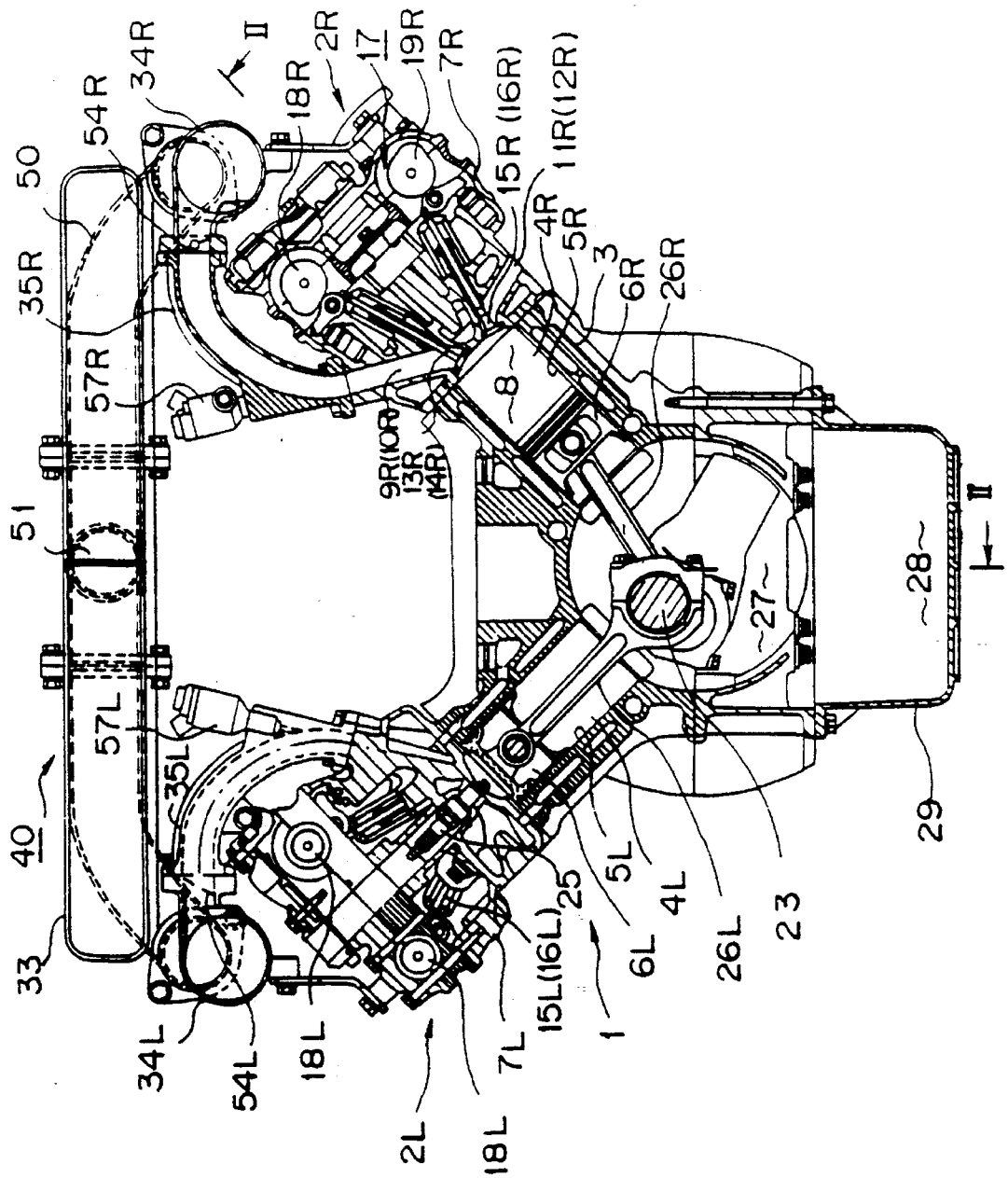
FIG. 1 is a longitudinal sectional view showing an embodiment of the spark ignition type reciprocating engine according to the present invention.
Figure 2:
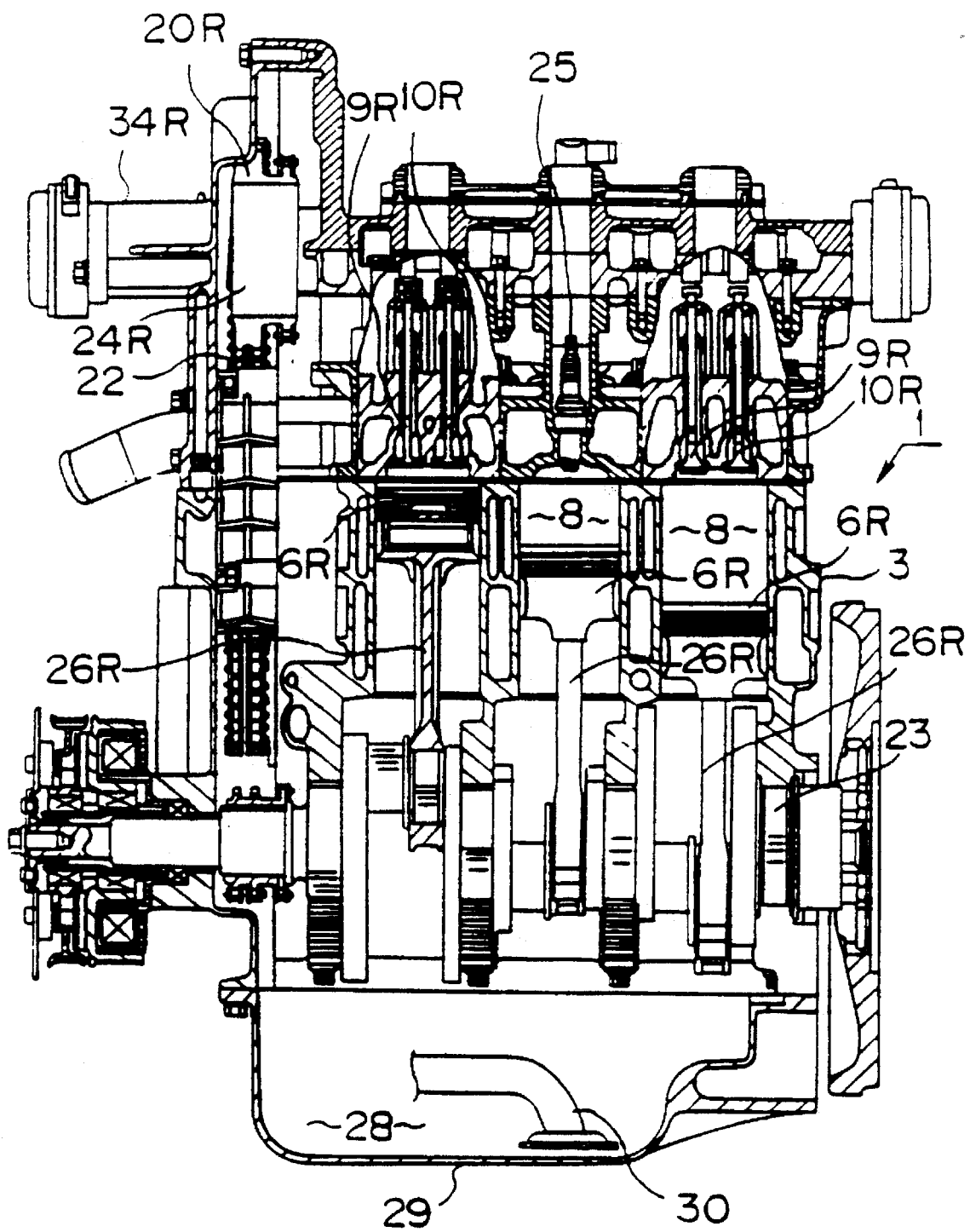
FIG. 2 is a sectional plan view taken along line II—II of FIG. 1.

Structure of Engine:

As shown in FIGS. 1 and 2, a body 1 of the engine has a left-hand bank portion 2L and a right-hand bank portion 2R arranged in a V-shaped relationship. Three cylinders, collectively referred to as 4, are arranged in each of the left-hand and right-hand bank portions 2L and 2R in line with each of the bank portions. In other words, the internal combustion engine to be employed for the embodiment of the present invention is a so-called V-type 6-cylinder engine. In the description which follows, reference symbols "L" and "R" used as suffixes, as needed, are intended to mean "left-hand" and "right-hand", respectively.

A detailed description will be made of the body 1 of the engine. The body 1 of the engine has a cylinder block 3 and each of the cylinders 4 has a combustion chamber 8 of a penthouse type formed and delimited by a piston 6 inserted into a cylinder section 5 and a cylinder head 7. As specifically shown in FIG. 1, the cylinder head 7 is provided with first and second intake ports 9 and 10 as well as first and second exhaust ports 11 and 12, each having an opening at the combustion chamber 8. As further shown in FIG. 1, a first intake valve 13 is mounted to the first intake port 9 and a second intake valve 14 is mounted to the second intake port 10; and a first exhaust valve 15 is mounted to the first exhaust port 11 and a second exhaust valve 16 is mounted to the second exhaust port 12.

The body 1 of the engine to be employed in this embodiment of the present invention is a 4-valve type engine having two intake valves 13 and 14 and two exhaust valves 15 and 16 for each cylinder. A valve-operating system 17 for operatively opening and closing the valves 13–16 is of a so-called double overhead cam (DOHC) type, which has two cam shafts 18 and 19 accommodated in the cylinder head 7. In other words, the first cam shaft 18 is adapted to operatively open and close the intake valves 13 and 14, and the second cam shaft 19 is adapted to operatively open and close the exhaust valves 15 and 16. As shown in FIG. 2, each of the first and second cam shafts 18 and 19 is provided at its shaft end with a cam pulley 20 for the intake valve (although a cam pulley for the exhaust valve is not shown in the drawing). The cam pulley 20 is mechanically associated with an output shaft (a crank shaft) 23 of the engine through a timing belt 22, in a manner as is known to the art, thereby opening and closing the intake valves 13, 14 and the exhaust valves 15, 16 at a predetermined timing, in synchronization with the rotation of the output shaft 23 of the engine.

To the first cam shaft 18 is mounted a first valve timing change-over mechanism 24 (for the intake valves) for changing a phase of the first cam shaft 18 for the cam pulley 20 for the intake valves, and the second cam shaft 19 is provided with a second valve timing change-over mechanism (for the exhaust valves) for changing a phase of the second cam shaft 19 for the cam pulley for the exhaust valves, although not shown in the drawing. The second valve timing change-over mechanism for the exhaust valves has the same structure as the first valve timing change-over mechanism 24 for the intake valves so that a description of details of the second valve timing change-over mechanism will be omitted from the description which follows. To each of the cylinder heads 7 is mounted an ignition plug 25 so as to face or direct to the center of the combustion chamber 8.

The piston 6 is connected to the crank shaft 23 through a connecting rod 26, and a chamber 28 for reserving or storing engine oil is formed by an oil pan 29 in a region underneath a crank chamber 27 for accommodating the crank shaft 23. In FIG. 2, reference numeral 30 denotes an oil strainer.

Above each of the left-hand and right-hand bank portions 2L and 2R is disposed a surge tank 34 extending lengthwise along the crank shaft 23, and the surge tank 34 is connected to the intake ports 9 and 10 for each cylinder 4 through a discrete intake tube 35. As an upstream end of each of the intake ports 9 and 10 in the respective left-hand and right-hand bank portions 2L and 2R is disposed so as to open facing an central space 31 interposed between the bank portions, the discrete intake tube 35 is arranged in such a shape as firstly extending transversely from the surge tank 34 toward the central space 31 and then curving downward.

A detailed description will now be made of an intake system 40 for the body 1 of the engine with reference to FIG. 3.

The intake system 40 comprises a common intake tube 41, the left-hand surge tank 34L, the right-hand surge tank 34R, and the discrete intake tube 35, which are disposed in this order from the upstream side toward the downstream side. To the common intake tube 41 are disposed an air cleaner 42, an air flowmeter 43, and a throttle valve 44 in this order from the upstream side toward the downstream side. The common intake tube 41 has a bypass 45 disposed so as to bypass the throttle valve 44.

The bypass 45 is provided with an ISC valve 47 which in turn can adjust the number of idling rotation in a manner as is known to the art. On the other hand, the left-hand surge tank 34L is communicated with the right-hand surge tank 34R through a connecting tube 50 which in turn is provided in its intermediate position with a valve 51 for controlling intake air variably, for example, thereby opening and closing the valve 51 in accordance with the number of rotation of the engine and achieving the dynamic effect of intake air over a wide region in a manner as is known to the art.

The discrete intake tube 35 is provided with a partition wall 35a to thereby divide its internal space partially into left-hand and right-hand sections, i.e. a first discrete intake tube 52 and a second discrete intake tube 53. The first discrete intake tube 52 is connected with the first intake port 9, and the second discrete intake tube 53 is connected with the second intake port 10. The second discrete intake tube 53 is so arranged as to be opened or closed with a shutter valve 54 mounted at its upstream end portion. Each of the shutter valves 54L disposed in the left-hand bank portion 2L is connected with a common shaft 55L for the left-hand bank portion 2L, and each of the shutter valves 54R disposed in the right-hand bank portion 2R is connected with a common shaft 55R for the right-hand bank portion 2R. To a shaft end of each of the common shafts 55L and 55R is mounted an actuator (not shown).

A fuel supply system of the body 1 of the engine comprises an electronic injector 57 which in turn is mounted in the discrete intake tube 35 so as to face the first intake port 9 and the second intake port 10. In FIG. 3, reference numeral 58 denotes an assist air passage and reference numeral 59 denotes a check valve.

Figure 3:
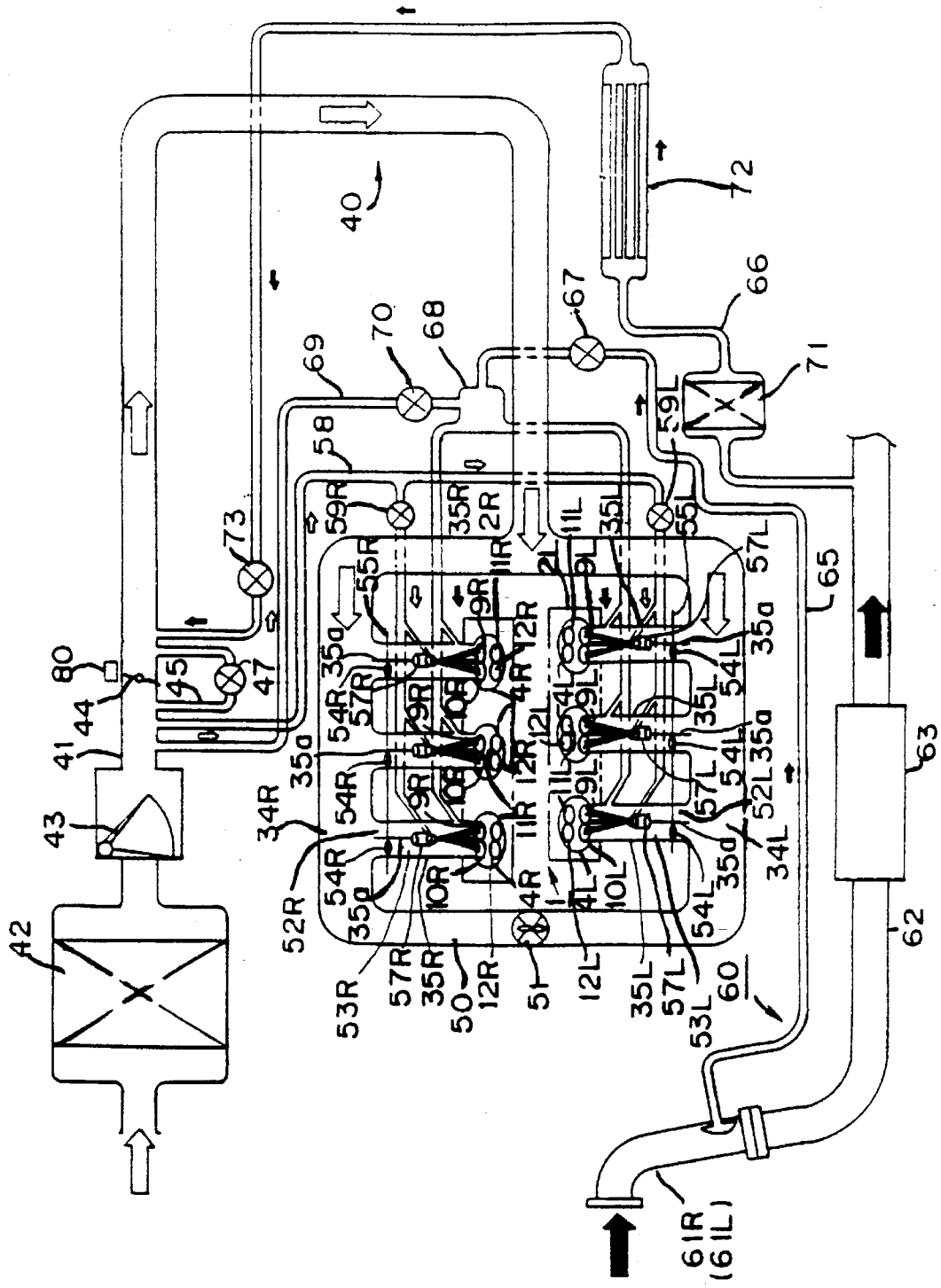
FIG. 3 is a schematic representation showing an intake system and an exhaust system of the internal combustion engine according to the present invention.

As shown in FIG. 3, an exhaust system 60 of the engine comprises a left-hand exhaust manifold 61L for the left-hand bank portion 2L, a right-hand exhaust manifold 61R for the right-hand bank portion 2R, and a common exhaust tube 62, which are disposed in this order from the upstream side toward the downstream side. The common exhaust tube 62 is provided in its intermediate position with a catalyst converter 63 for cleaning exhaust gases and at its downstream end with a silencer (not shown) in a manner as is known to the art.

The body 1 of the engine has a first outer EGR passage 65 and a second outer EGR passage 66, and a transversely sectional diameter of the first outer EGR passage 65 is smaller than that of the second outer EGR passage 66. The first outer EGR passage 65 is so adapted as to be employed in a low load region, while the second outer EGR passage 66 is so adapted as to be employed in a high load region, as will be described hereinafter.

The first outer EGR passage 65 is connected at its one end to the exhaust manifold 61L or 61R and at its other end to the first intake port 9. To the first outer EGR passage 65 are mounted a first EGR valve 67 on its one end side and a collective chamber 68 on its other end side. The collective chamber 68 is communicated with the common intake tube 41 through a bypass air tube 69 to which a bypass air control valve 70 in turn is mounted. On the other hand, one end of the second outer EGR passage 66 is connected to the common exhaust tube 62 on the side downstream of the catalyst converter 63, and the other end thereof is connected to the common intake tube 41 on the side downstream of the throttle valve 44. The second outer EGR passage 66 is provided from the one end side to the other end side with a carbon trap 71, an EGR cooler 72, and a second EGR valve 73.

Specification of Engine:

A specification of the engine is as follows:

(1) Type of engine: V-type 6-cylinder; DOHC 4-valve engine
(2) Angle between the left-hand bank portion and the right-hand bank portion: 90°
(3) Displacement: 1,496 cc
(4) Bore size of cylinder: 63 mm in diameter
(5) Stroke of piston: 80 mm
(6) Compression ratio ($\epsilon$): $\epsilon=12$ (although $\epsilon=11$ is also acceptable)
(7) Angle between the intake valve and the exhaust valve: 30°
(8) Fuel: regular gasoline (octane value=91)

In other words, the spark ignition type reciprocating engine according to the embodiment of the present invention has the cylinder section 5 with a small bore size and a long stroke wherein the stroke of the piston is larger with respect to the bore size. Further, the engine has a high compression ratio.

Figure 4:
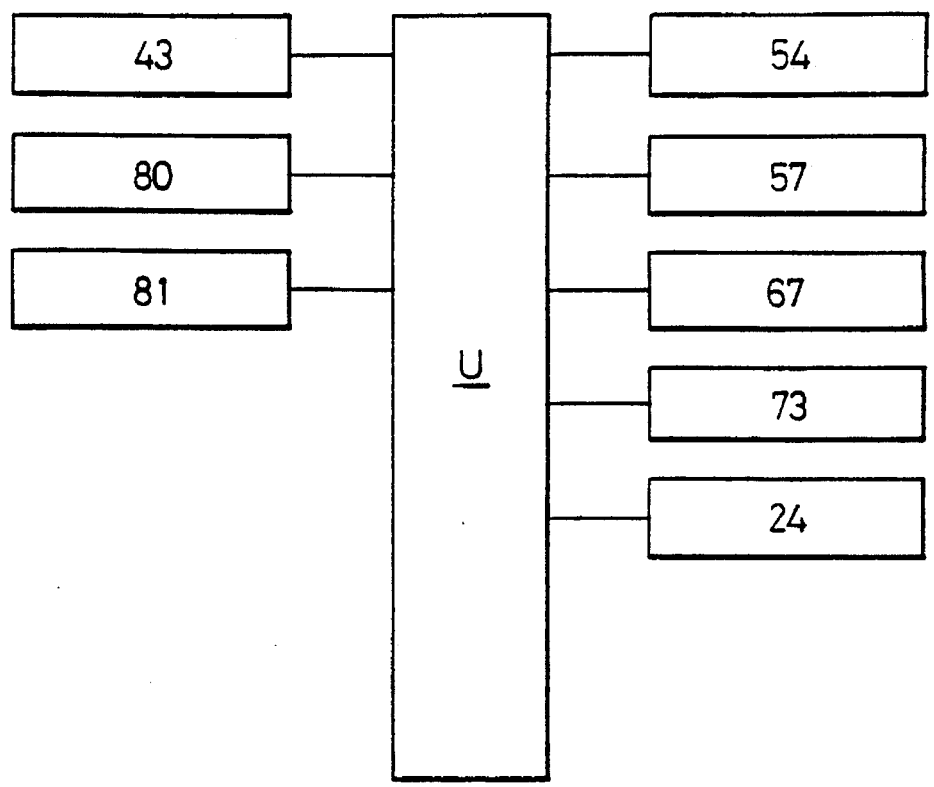
FIG. 4 is a block diagram showing a control system of the internal combustion engine according to the present invention.

The engine has a control unit U as shown in FIG. 4, and the control unit U is comprised of, for example, a microcomputer. Into the control unit U, signals are entered from the air flowmeter 43 for sensing an amount of intake air, a sensor 80 for sensing an angle of the opening of the throttle valve 44, and a sensor 81 for sensing the number of rotation of the engine. On the other hand, the control unit U generates control signals to the shutter valve 54, the electronic injector 57, the first EGR valve 67, the second EGR valve 73, and the first valve timing change-over mechanism 24 for the intake valves.

Control of Shutter Valve 54:

The shutter valve 54 is so arranged as to be closed in a low rotation region where the number of rotation of the engine is lower than, for example, 3,000 rpm and opened in a high rotation region where the number of rotation of the engine is higher than, for example, 3,000 rpm. In such a low rotation region where the amount of intake air is smaller, on the one hand, the intake is performed by opening the first discrete intake tube 52 only while closing the second discrete intake tube 53. In the high rotation region where the amount of intake air becomes larger, on the other hand, the intake is performed by opening both of the first and second discrete intake tubes 52 and 53.

Figure 5:
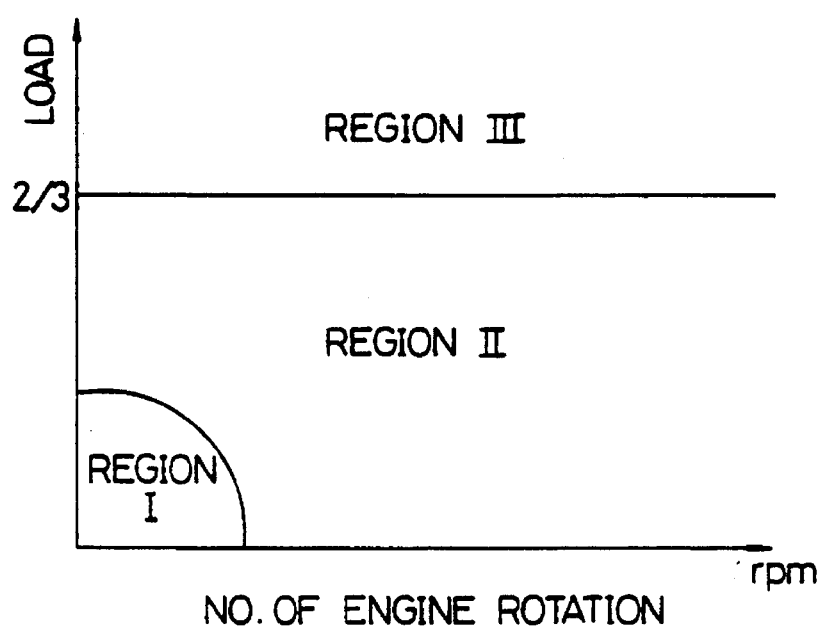
FIG. 5 is a map for controlling a shutter valve disposed in an intake passage.

Control of Valve Timing:

The valve timing for regions I, II and III will be described with reference to the map as indicated in FIG. 5.

Figure 6:
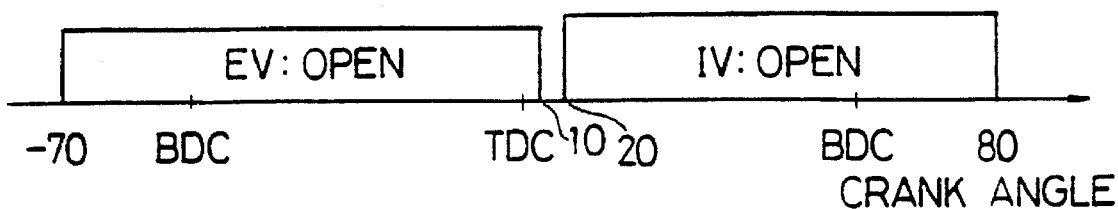
FIG. 6 is a diagram describing the action of a variable valve timing in a region I.

Region I: The region I is a region where the load of the engine is low and the number of rotation of the engine is low. As shown in FIG. 6, reference symbol "EV" denotes the exhaust valve and reference symbol "IV" denotes the intake valve (this being applied to FIGS. 7 and 8).

In this region, the valve timing for opening the exhaust valves 15 and 16 is set at 70 deg (crank angle) before the bottom dead center (BBDC) while the valve timing for closing them is set at 10 deg (crank angle) after the top dead center (ATDC); on the other hand, the valve timing for opening the intake valves 13 and 14 is set at 20 deg (crank angle) after the top dead center (ATDC) while the valve timing for closing them is set at 80 deg (crank angle) after the bottom dead center (ABDC).

Region II: This region is a region where the load of the engine is below two thirds of the load.

Figure 7:
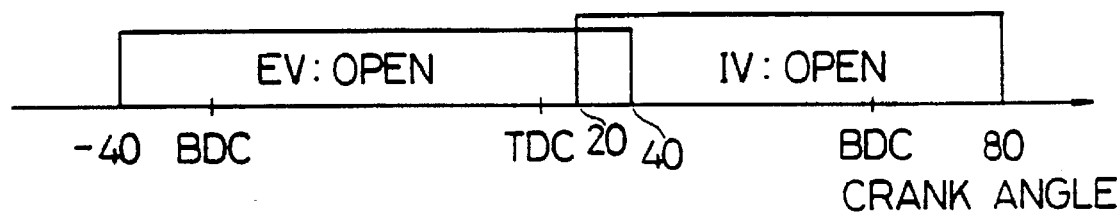
FIG. 7 is a diagram describing the action of the variable valve timing in a region II.

In the region II, as shown in FIG. 7, the valve timing for opening the exhaust valves 15 and 16 is set at 40 deg (crank angle) before the bottom dead center (BBDC) and the valve timing for closing them is set at 40 deg (crank angle) after the top dead center (ATDC). On the other hand, the valve timing for opening the intake valves 13 and 14 is set at 20 deg (crank angle) after the top dead center (ATDC) and the valve timing for closing them is set at 80 deg (crank angle) after the bottom dead center (ABDC).

Region III: This region is a region where the load of the engine is above two thirds of the load.

Figure 8:
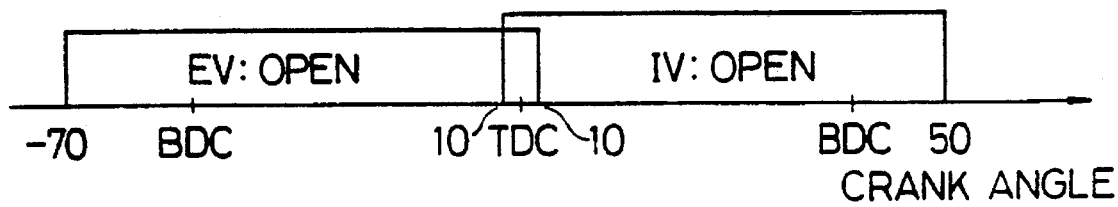
FIG. 8 is a diagram describing the action of the variable valve timing in a region III.

In the region III, as shown in FIG. 8, the valve timing for opening the exhaust valves 15 and 16 is set at 70 deg (crank angle) before the bottom dead center (BBDC) and the valve timing for closing them is set at 10 deg (crank angle) after the top dead center (ATDC). On the other hand, the valve timing for opening the intake valves 13 and 14 is set at 10 deg (crank angle) before the top dead center (BTDC) and the valve timing for closing them is set at 50 deg (crank angle) after the bottom dead center (ABDC).

In summary, the intake valves 13 and 14 are set so as to be delayed in closing in such partially loaded regions. Specifically, in the region I, the intake valves 13 and 14 are opened after the exhaust valves 15 and 16 have been closed; alternatively, an overlap of an open state of the intake valve with an open state of the exhaust valve is set to be smaller than in the region II and III. In the region II, an overlap of the range of the crank angle, at which the exhaust valves 15 and 16 are open, with the range of the crank angle, at which the intake valves 13 and 14 are open, is larger than an overlap of the open state of the intake valve with the open state of the exhaust valve in the region III. In the region III, an overlap of the crank angle, at which the exhaust valves 15 and 16 are open, with the crank angle than that in the region I and smaller than that in the region II.

The foregoing description can be briefed as follows:

(1) Region I (with the low load of the engine and the low number of rotation of the engine): the overlap is zero or smaller and the closing of the intake valves is delayed.

(2) Region II (with the load of the engine smaller than two thirds of the entire load): the overlap is zero and the closing of the intake valves is delayed.

(3) Region III (with the Load of the engine larger than two thirds of the entire load): the overlap is the same and the timing of closing the intake valves is the same as conventional ones.

Figure 9:
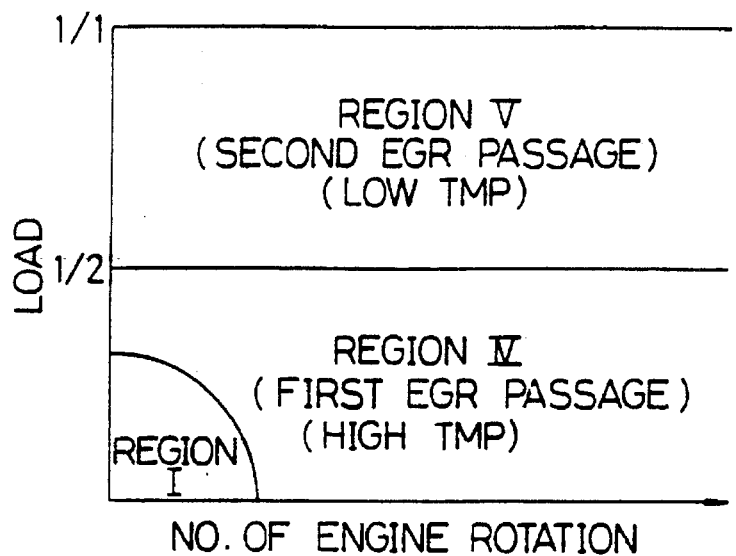
FIG. 9 is a control map for exhaust gas recirculation (EGR).

Control of EGR:

The control of the recirculation of exhaust gases (EGR) is performed in three regions, i.e. region I, IV, and V, on the basis of the map as indicated in FIG. 9 by controlling the first EGR valve 67 and the second EGR valve 73 in a fashion as will be described hereinafter.

Region I: This region is a region wherein the load of the engine is low and the number of rotation of the engine is low, as have been described hereinabove.

In this region I, both of the first and second EGR valves 67 and 73 are closed.

Region IV: This region is a region wherein the load of the engine is smaller than two thirds of the total amount of the load.

In the region IV, a rate of the EGR is adjusted by the first EGR valve 67 while the second EGR valve 73 is closed. In other words, exhaust gases are recirculated by taking advantage of the first outer EGR passage 65.

Region V: This region is a region in which the load of the engine is over the full range from the region larger than two thirds of the total load up to the total amount of the load.

In the region V, a rate of the EGR is adjusted by the second EGR valve 73 while the first EGR valve 67 is closed. In other words, exhaust gases are recirculated by the aid of the second outer EGR passage 72 with the EGR cooler 72. Further, in this region, the rate of the EGR is so arranged as to be constant or to be increased as the load becomes larger.

Figure 10:
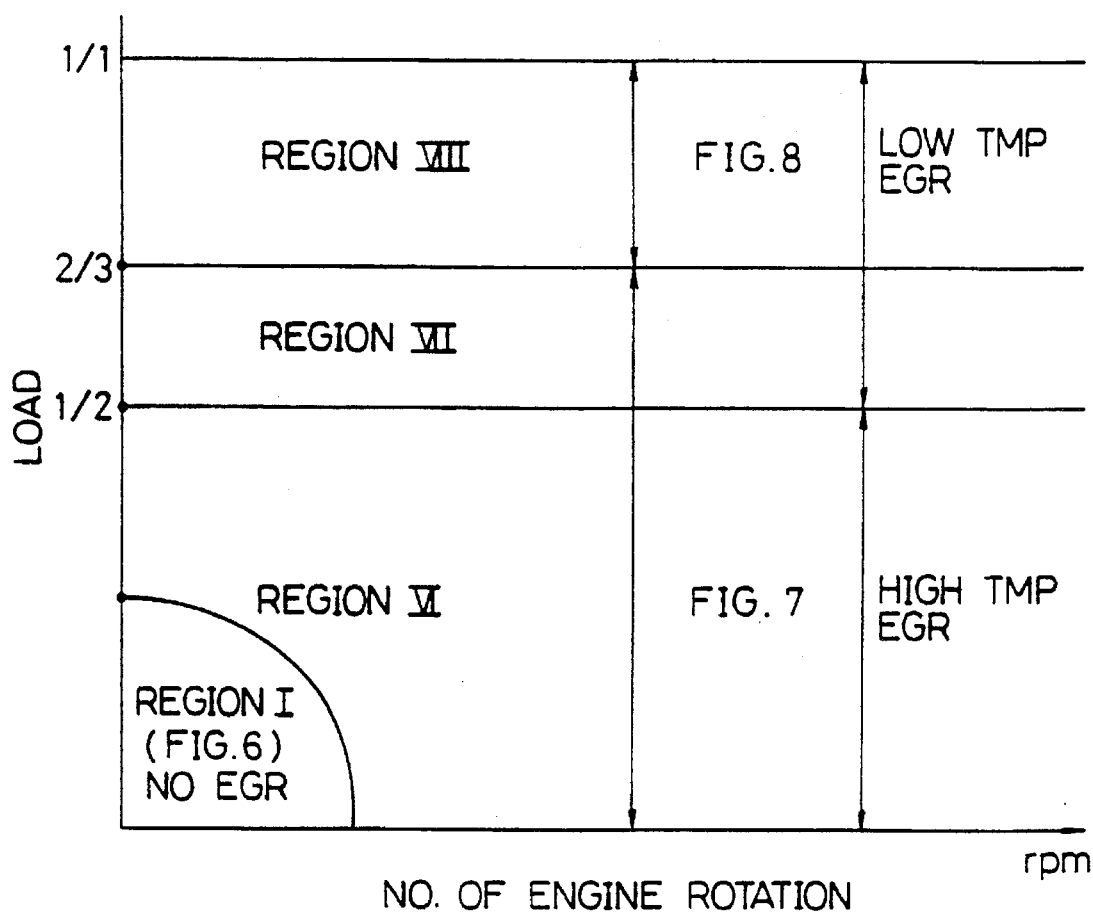
FIG. 10 is a control map for performing the control of the shutter valve and the control of the EGR.

It is to be noted that FIG. 10 is prepared by a combination of FIG. 5 indicative of the control of the valve timing with FIG. 9 indicative of the control of the EGR. In FIG. 10, the region is divided into four regions, I, VI, VII and VIII. A detailed description will be made of the regions I, VI and VIII, where the problems arise with stability in combustion, fuel economy or knocking. The engine is controlled in these regions in such a manner as will be described hereinafter.

Region I: This region is a region in which the load is extremely light, that is, the load is low and the number of rotation of the engine is low, as described hereinabove. In the region I, combustion is likely to become unstable.

In this region, an outer EGR via the outer EGR passages is inhibited and there is no overlap or a smaller overlap between the crank angle at which the exhaust valves 15 and 16 are open and the crank angle at which the intake valves 13 and 14 are open. Hence, the amount of gases which are left in the combustion chamber 8 is so small that the stability in combustion can be ensured. Further, as the angle at which the throttle valve 44 is open is small in the region I, the closing of the intake valves 13 and 14 is delayed, so that a loss in pumping can be reduced.

Region VI: This region is a region where the load is light, or the load of the engine is lower than two thirds of the total amount of the load.

In the region VI, the combustion is relatively stable, so that an overlap of the crank angle at which the exhaust valves 15 and 16 are open with the crank angle at which the intake valves 13 and 14 are open is set to be larger. Hence, an internal EGR is performed in addition to the recirculation of exhaust gases from the first outer EGR passage 65. In other words, in the region VI, as the overlap of the range in which the exhaust valves 15 and 16 are open with the range in which the intake valves 13 and 14 are open so as to become large, the internal EGR is carried out by causing a large amount of gases to be remained in the combustion chamber 8. The exhaust gases to be remained in the combustion chamber 8 for the internal EGR are high in temperature. Further, the exhaust gases to be recirculated through the first outer EGR passage 65 are relatively high in temperature because the exhaust gases withdrawn from the engine are recirculated to the engine through the first outer EGR passage 65 whose upstream end is communicated with the exhaust manifold 61, before they are allowed to become cool.

In addition, the closing of the intake valves 13 and 14 is delayed, so that the delay in closing them in combination with the recirculation of the exhaust gases having higher temperature can reduce a loss in pumping in the region VI.

Region VIII: This region contains the whole region of the load of the engine higher than two thirds of the total amount of the load thereof.

In the region VIII, the overlap of the range of the crank angles at which the exhaust valves 15 and 16 are open with the range of the crank angles at which the intake valves 13 and 14 are open is so conventional and the timing of closing the intake valves is so conventional that air can be filled in the combustion chamber in an appropriate way. In addition, in the region VIII, the exhaust gases are allowed to cool with the second outer EGR passage 66 with the EGR cooler 72 and then recirculated, i.e. a so-called cold EGR is performed, thereby suppressing the temperature within the cylinder from elevating.

In the region VIII, the temperature within the cylinder can be lowered in the way as described hereinabove by means of scavenging, delaying the closing of the intake valves 13 and 14, and the cold EGR, so that an occurrence of knocking can be suppressed and the amount of NOx within the exhaust gases can be decreased in the region VIII.

Figure 11:
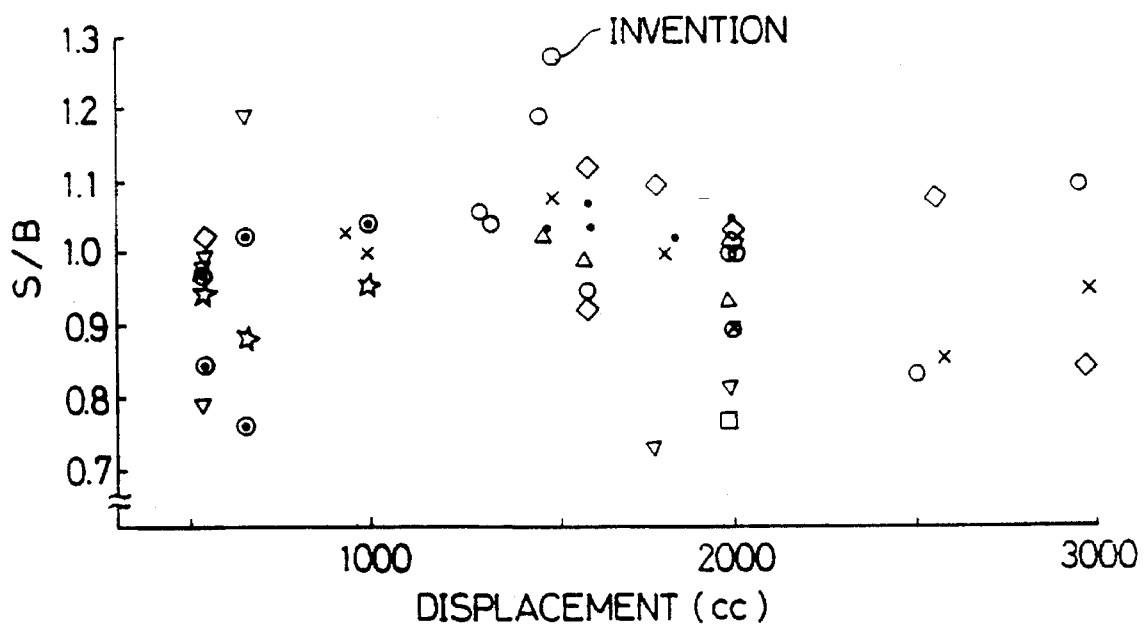
FIG. 11 is a diagram showing a comparison between the internal combustion engine according to the embodiment of the present invention and the conventional engine on the basis of the S/B ratio vs. displacement.
Figure 12:
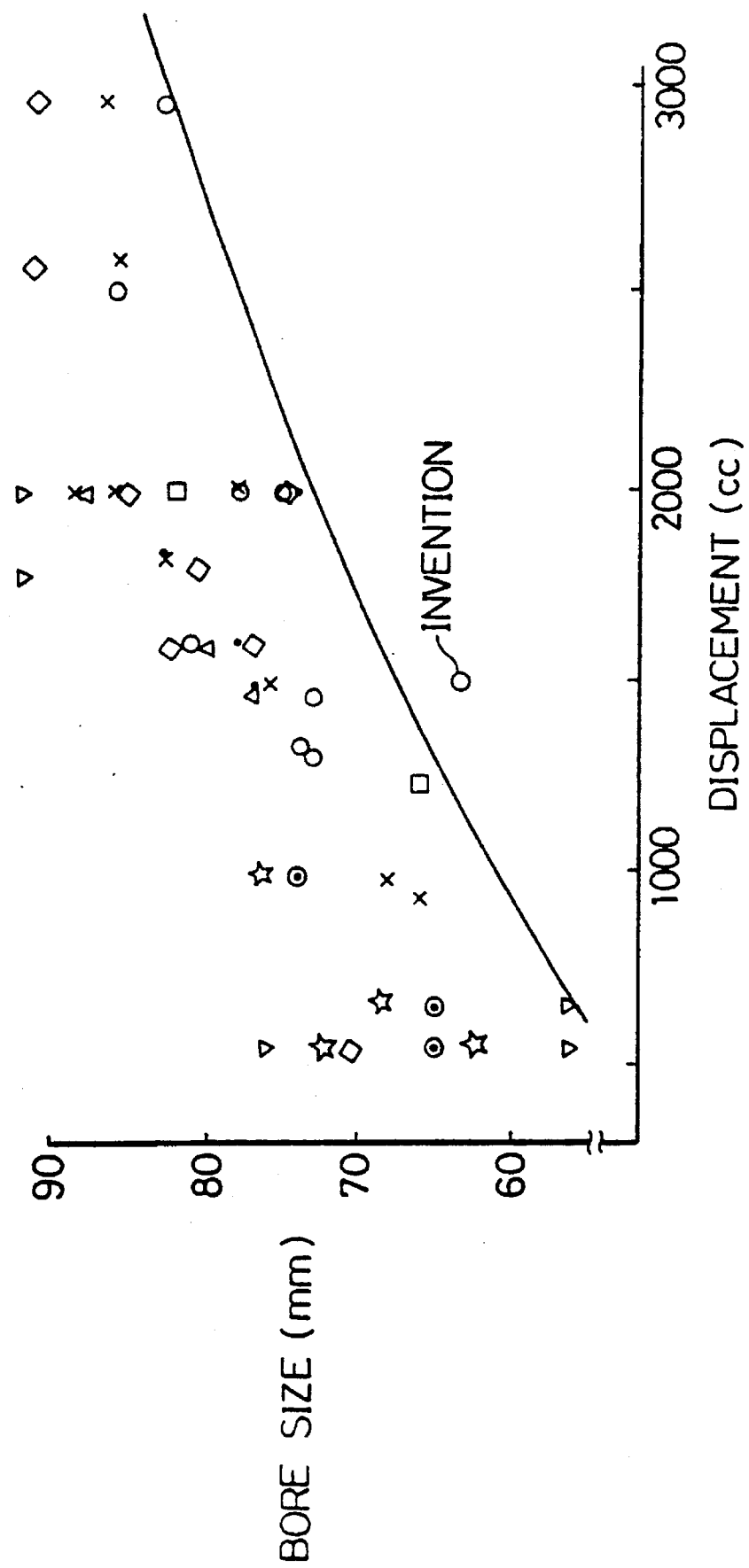
FIG. 12 is a diagram showing a comparison between the internal combustion engine according to the embodiment of the present invention and the conventional engine on the basis of the bore size of the cylinder vs. displacement.
Figure 13:
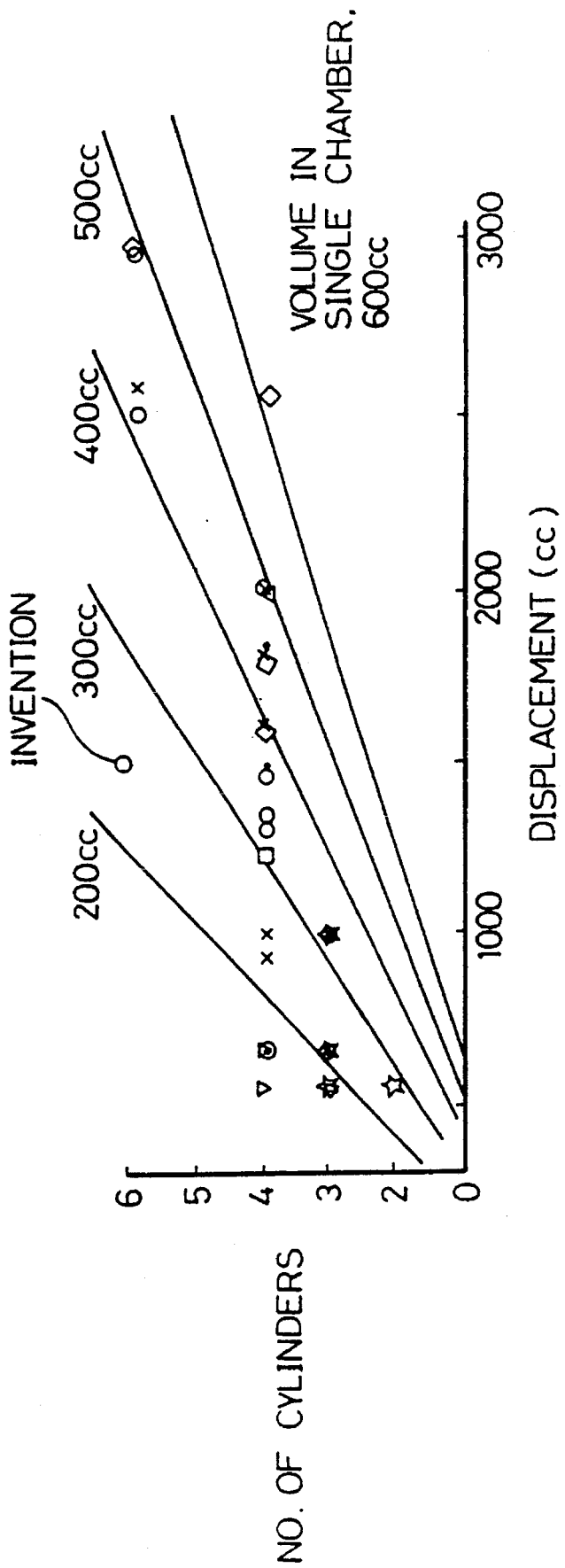
FIG. 13 is a diagram showing a comparison between the internal combustion engine according to the embodiment of the present invention and the conventional engine on the basis of the number of cylinders vs. displacement.

It is to be noted that FIGS. 11 to 13 indicate each a comparison of the characteristics of the engine according to the present invention and conventional ones. As is apparent from FIG. 11, it is found that the engine according to the present invention has a stroke longer than the conventional ones; it is found from FIG. 12 that the bore size is small with respect to the displacement; and it is further found from FIG. 13 that the number of cylinders is large with respect to the displacement.

Hence, the engine according to the present invention having the characteristics as described hereinabove can achieve improvements in heat efficiency and fuel economy while suppressing the knocking from occurring by making the bore size smaller and the compression ratio higher. Further, the engine according to the present invention can reduce a burden imposed upon the bearing units, thereby reducing a mechanical loss. In addition, the engine with multiple cylinders according to the present invention can make an internal combustion engine with less vibration.

Figure 14:
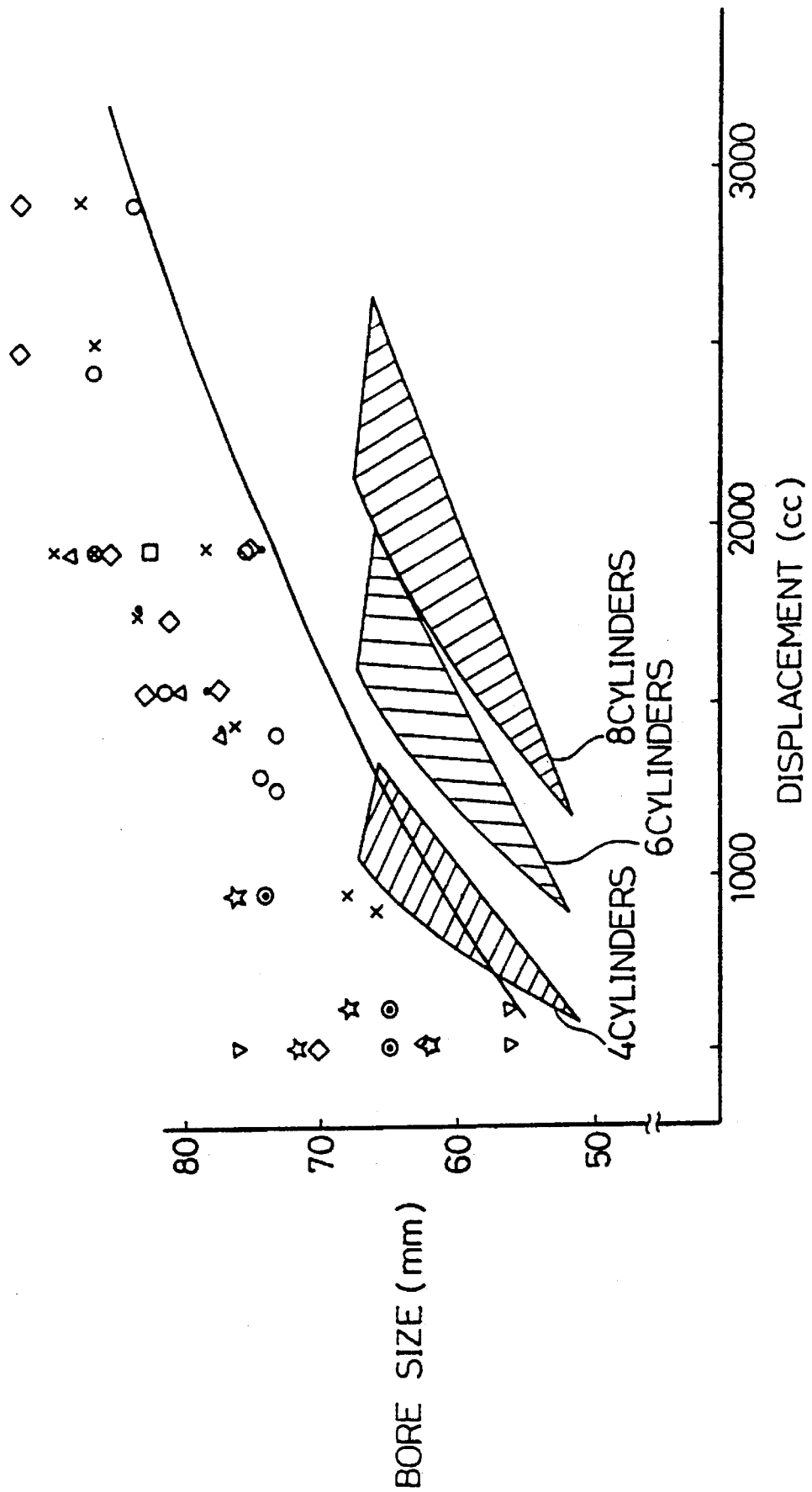
FIG. 14 is a diagram showing a comparison of the number of cylinders between the internal combustion engine with two intake valves and two exhaust valves for each cylinder according to the embodiment of the present invention and the conventional engine on the basis of the bore size vs. displacement

Further, it is to be noted that the engine according to the present invention can provide a variety of internal combustion engines with the number of cylinders varied without alteration of the configuration of each one of the cylinders. FIG. 14 indicates a comparison of the engines with four, six and eight cylinders with conventional engines.

For the engine according to the present invention, the temperature within the cylinder may be lowered by injecting water into the combustion chamber 8 in the high load region in order to further prevent the knocking from occurring in the high load region. The lower the temperature within the cylinder the more completely the knocking can be prevented, that is, the more difficult it is to cause the knocking to occur, and the higher the compression ratio can be made.

Figure 15:
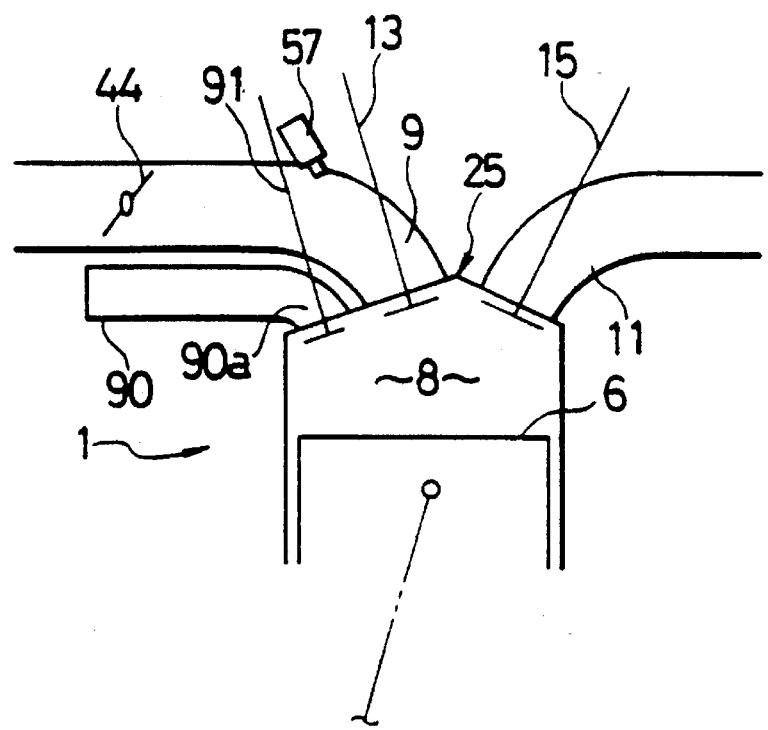
FIG. 15 is a schematic representation showing an internal combustion engine with a sub-chamber according to a variant of the embodiment of the present invention.

Further, a sub-chamber 90 may be disposed in the body 1 of the engine as a means for preventing an occurrence of knocking, as shown in FIG. 15. In FIG. 15, the same elements are provided with the same reference numerals as those shown in FIG. 1 and other drawings and a description of those elements will be omitted from the explanation which follows.

Engine with Sub-chamber (FIG. 15):

The sub-chamber 90 disposed in the body 1 of the engine is provided with a sub-chamber port 90a having an opening in the combustion chamber 8, and a sub-chamber valve 91 is mounted at the sub-chamber port 90a. In the high load region (as indicated by the region V in FIG. 9), the sub-chamber port 90a is so arranged as to be opened or closed with the sub-chamber valve 91. On the other hand, in the low load region (as indicated by the regions I and IV in FIG. 9), the sub-chamber port 90a is so arranged as to be closed with the sub-chamber valve 91.

Figure 16:
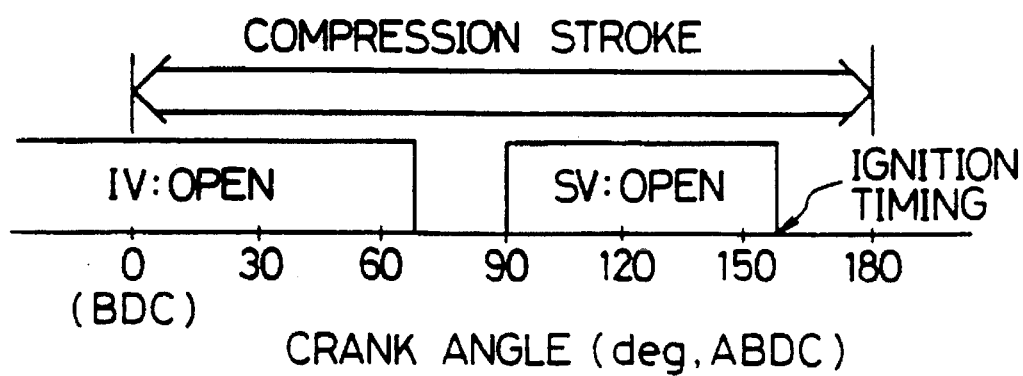
FIG. 16 is a diagram showing the timing for opening and closing a sub-chamber valve of the internal combustion engine with the sub-chamber.

FIG. 16 shows an example of the timing of opening and closing the sub-chamber port 90a with the sub-chamber valve 91 in the high load region.

As is apparent from FIG. 16, the timing of closing the sub-chamber port 90a with the sub-chamber valve 91 is the same as the timing of ignition, i.e. 160 deg after the bottom dead center (ABDC), and the sub-chamber port 90a is opened at approximately 70 deg before that closing timing, thereby allowing the mixed air within the sub-chamber 90 to be replaced with the mixed air within the combustion chamber 8.

It can further be noted that the timing of opening the sub-chamber valve 91 may preferably be in the process of the stroke of compression, particularly in the middle stage, and the timing of closing it may preferably be substantially the same as or somewhat earlier than the timing of ignition, although the timing of closing the sub-chamber valve 91 may be set in the initial stage of the stroke of explosion. Further, the volume of the sub-chamber 90 may be set to be from approximately 20% to 50% of the volume of the combustion chamber at the top dead center, and the area of the sub-chamber valve 91 may be set to be from approximately 20% to 30% of the area of the intake valve.

The arrangement for the engine as have been described hereinabove allows a portion of the mixed fuel within the combustion chamber 8 to be closed in the sub-chamber 90 with the sub-chamber valve 91 so disposed as to be opened or closed during the stroke of compression, and the portion of the mixed fuel is then cooled in the sub-chamber 90 and then replaced with a portion of the mixed fuel within the combustion chamber 8 during the stroke of compression which follows, thereby lowering the temperature within the cylinder in the high load region to a level lower than that of the conventional engines with no sub-chamber equipped therewith and suppressing the knocking from occurring.

An internal combustion engine is so designed as to translate an increase in pressure (a rate of elevation of the pressure within the cylinder, $\Delta P$) associated with the combustion of the fuel fed to its combustion chamber into mechanical work. Hence, the internal combustion engine can do better work as the rate of elevation of the pressure within the cylinder, ΔP, becomes larger. Given the combustion at a constant volume, the rate of elevation of the pressure within the cylinder, ΔP, can be represented by the formula (1) as follows:

$$\Delta P = (\epsilon R/V) \times (Q/Cv) \quad (1)$$

where

ε is the compression ratio;

R is the gas constant;

Q is the heat capacity of fuel;

V is the volume of the combustion chamber; and

Cv is the specific heat at a constant volume.

A review will now be made of an impact of changes in temperature upon the rate of elevation of the pressure within the cylinder, ΔP. Differentiation of the formula (1) above gives the formula (2) as follows:

$$d(\Delta P)/dT = -(\epsilon R/V) \times (Q/Cv^2) \times (dCv/dT) \quad (2)$$

Figure 17:
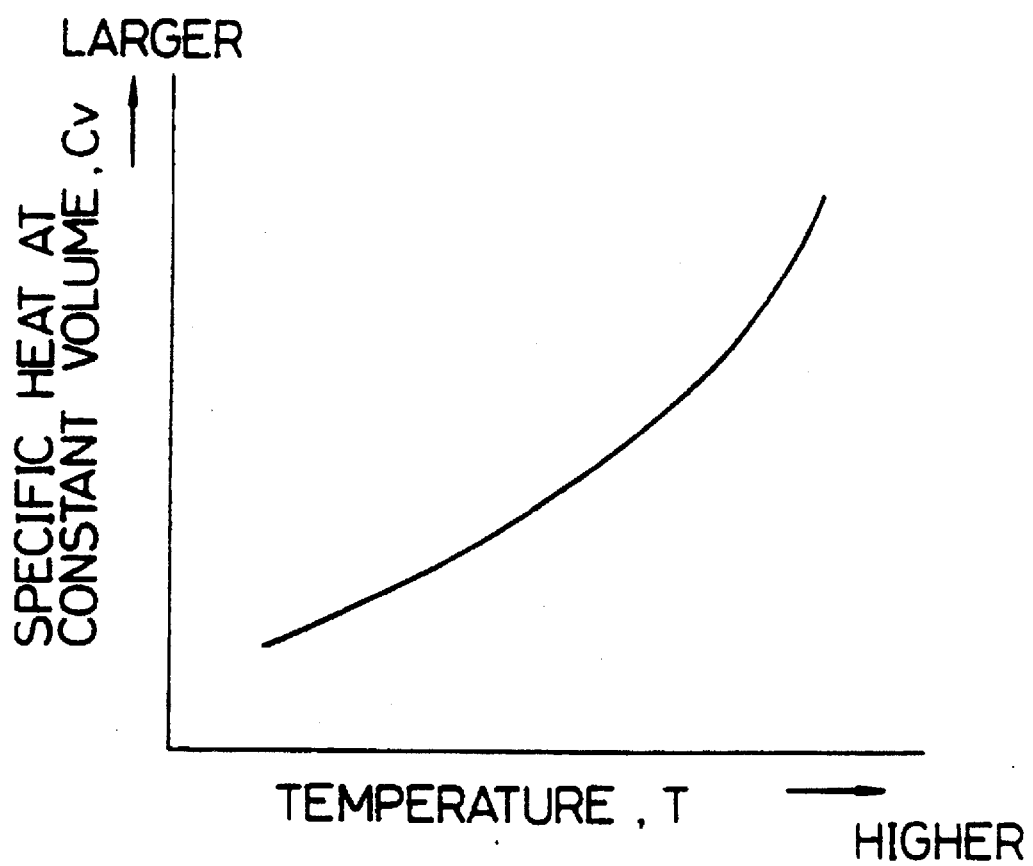
FIG. 17 is a graph showing the relation of temperatures vs. the specific heat at constant volume.
Figure 18:
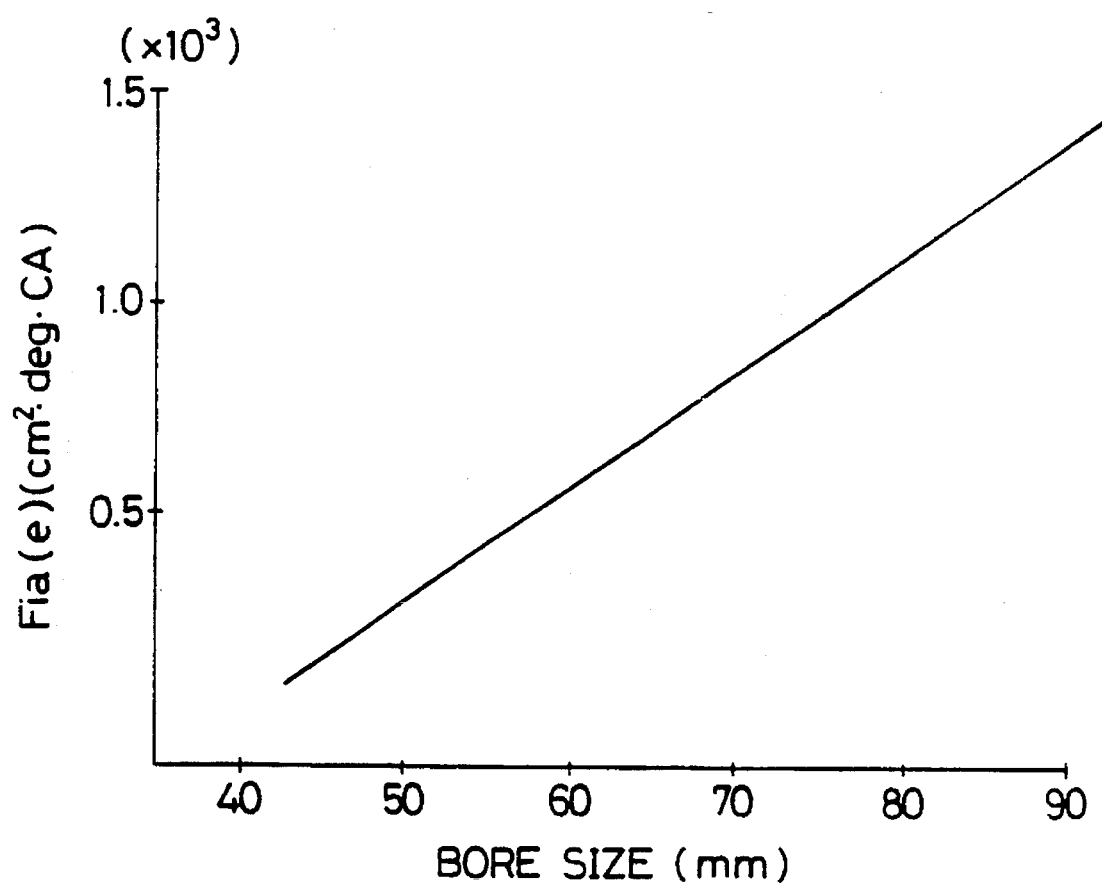
FIG. 18 is a graph showing the relation (the result of computation) between the bore sizes vs. the effective angular area of the intake valve, Fia(e).
Figure 19:
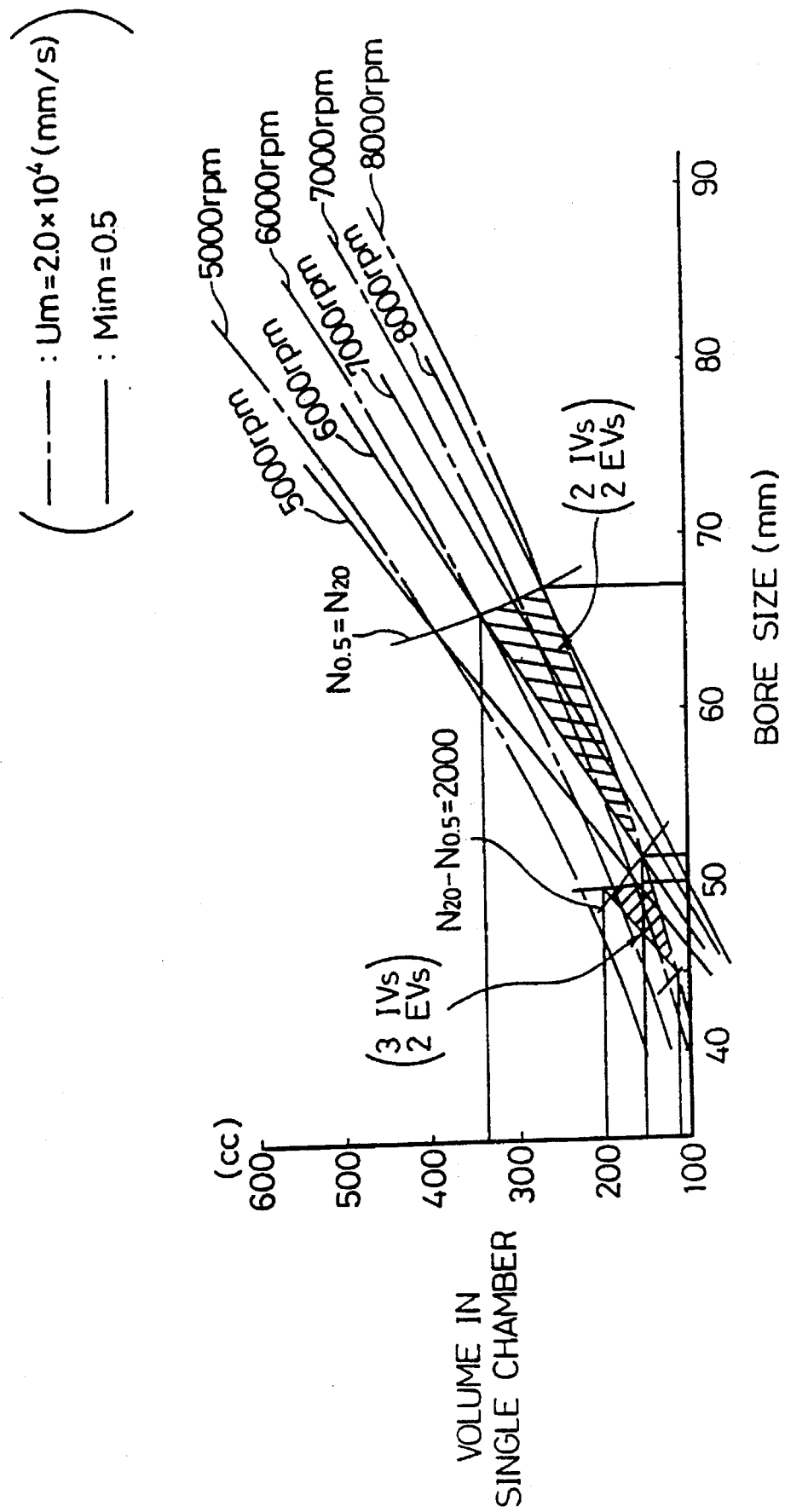
FIG. 19 is a diagram showing the relation between the bore sizes and the volumes of the single chamber, suitable for the spark ignition type reciprocating engine according to the present invention.

It can be noted herein that the specific heat at a constant volume, Cv, becomes larger as the temperature is made higher, as indicated in FIG. 17. Hence, the expression, (dCv/dT), of the right side of the formula (2) above is larger than 0 (zero) so that the right side of the formula (2) above gives a negative value.

Hence, the expression, d(ΔP)/dT, of the left side of the formula (2) above gives a negative value; in other words, the higher the temperature within the cylinder the smaller the rate of elevation of the pressure within the cylinder, ΔP. This means that the lower the temperature within the cylinder, the higher the rate of elevation of the pressure within the cylinder, ΔP, and the better job the engine can do.

The fact that the engine can do better work as the temperature within the cylinder becomes lower may be described from another point of view.

The heat capacity Q of fuel can be represented by the formula (3) as follows:

$$Q = Cv \times G \times \Delta T \quad (3)$$

where

Cv is the specific heat at a constant volume;

G is the mass of the mixed fuel charged into the combustion chamber; and

ΔT is the rate of elevation of temperature associated with combustion (the rate of elevation of the temperature within the cylinder).

The formula (3) above can be modified into the formula (4) as follows:

$$\Delta T = Q/(Cv \times G) \quad (4)$$

As is understood from the formula (4) above, the rate of elevation of the temperature, ΔT, becomes higher as the specific heat at a constant volume, Cv, is made smaller, provided that the heat capacity of the fuel, Q, and the mass of the mixed fuel charged into the combustion chamber are set constant.

It can be noted that the specific heat at a constant volume, Cv, becomes larger as the temperature T is made higher, as shown in FIG. 17. In other words, the lower the temperature within the cylinder, T, the smaller the specific heat at a constant volume, Cv; hence, the lower the temperature within the cylinder, T, the higher the rate of elevation of the temperature within the cylinder, ΔT, associated with the combustion.

Since the pressure within the cylinder is caused to be raised at a larger rate of elevation of the pressure within the cylinder, ΔP, as the rate of elevation of the temperature within the cylinder, ΔT, becomes higher, the rate of elevation of the pressure within the cylinder, ΔP, becomes larger as the temperature within the cylinder, T, is lower. In other words, if the same amount of the heat capacity would be created by the same amount of fuel charged, it can be noted that, as the temperature within the cylinder, T, is made lower, the rate of elevation of the pressure within the cylinder, ΔP, becomes higher, thereby doing better work and giving better heat efficiency.

As will be apparent from the foregoing description, the provision of the sub-chamber 90 in the body 1 of the engine permits the knocking to be suppressed from occurring in the high load region as well as improves the heat efficiency in the high load region.

When the elevation of the temperature associated with the compression of the mixed fuel within the combustion chamber is to be utilized to the maximum extent, the timing of closing the sub-chamber valve 91 is set to be at the top dead center of compression. Alternatively, when the elevation of the pressure associated with the combustion is to be utilized to the maximum extent, the timing of closing the sub-chamber valve 91 is set as late as possible. It can be noted herein that the angle of the crank at which the pressure associated with the combustion reaches the maximum is generally at approximately 30 deg after the top dead center of compression (ATDC).

It is generally known that actual states of combustion vary largely with cycles. If the sub-chamber valve 91 would be kept open until a deviation of the pressures within the cylinder becomes large, it is undesirable that the pressure, the density, and the temperature of the mixed fuel enclosed within the sub-chamber 90 may vary in each of cycles. Hence, if the sub-chamber valve 91 would be closed immediately before the occurrence of the deviation in the elevation of the pressure associated with the combustion, the impact of the deviation in the combustion can be suppressed, and the effect of cooling the mixed fuel can be improved.

Variant of Engine with Sub-chamber:

The knocking is unlikely to occur as the load of the engine becomes lighter (in the light load region). If the heat efficiency is to be improved in the light load region by lowering the temperature within the cylinder, however, the valve timing of opening and closing the sub-chamber valve 91 may be conveniently changed by the aid of the valve timing change-over mechanism in such a manner that the valve timing of opening and closing the sub-chamber valve 91 is set so as to approach the valve timing of closing the intake valves 13 and 14 in accordance with the load as the load becomes smaller. This arrangement can suppress the loss of the pressure associated with the introduction of the mixed fuel into the sub-chamber 90 to a minimum extent and it can improve the heat efficiency due to a decrease in the temperature within the cylinder.

As a means for forcibly lowering the temperature of the mixed fuel within the sub-chamber 90, a movable piston may be mounted within the sub-chamber 90, which is so arranged as to displace within the sub-chamber 90 in synchronization with the rotation of the crank shaft 23, thereby causing the mixed fuel to flow in the sub-chamber 90. Alternatively, the movable piston may be so biased with a spring as to forcibly cause the substantial volume of the sub-chamber 90 to be made smaller, when the sub-chamber valve 91 is opened, thereby causing the mixed fuel passing through the sub-chamber port 90a to flow or move.

Other Means for Preventing Knocking (Lean Burn):

For a lean-burn engine wherein the air-fuel ratio is leaner than the stoichiometric air-fuel ratio, a portion of the heat capacity produced by the combustion is absorbed by a surplus of the air, thereby lowering the temperature within the cylinder, T. The leaner the air-fuel ratio, the larger the surplus amount of the air. This makes the temperature within the cylinder, T, lower, thereby making the knocking unlikely to occur and improving the heat efficiency. Further, actually, the reduction of the temperature within the cylinder reduces the transmission of heat to the wall surface of the combustion chamber and it can decrease the loss in cooling. Hence, the leaner air-fuel ratio can reduce the loss in cooling and as a result it can improve the heat efficiency.

For example, even if the air-fuel ratio would be set to as extremely lean as A/F=30, ignitability and combustibility can be ensured by making the intake port 9 in a swirl port or in a tumble port or by making the compression ratio larger in accordance with the lean extent of the air-fuel ratio or by igniting at multiple points.

Although the region in which the engine is running in a lean air-fuel ratio may be set so as to cover all the region in which the engine is running, the engine is driven in a lean air-fuel ratio, for example, in the constantly running region, particularly in the middle-rotational and middle load region. In the region other than the region where the engine is running in such a lean air-fuel ratio, it can be driven, for example, in the stoichiometric air-fuel ratio. Specifically, the engine is run in the lean air-fuel ratio in the regions VI and VII of FIG. 10, although the engine may be run in these regions, given the number of rotation of the engine being set to a predeter-mined value, e.g. 4,000 rpm or slower. In the regions I and VIII, the engine is run in the stoichiometric air-fuel ratio.

Figure 20:
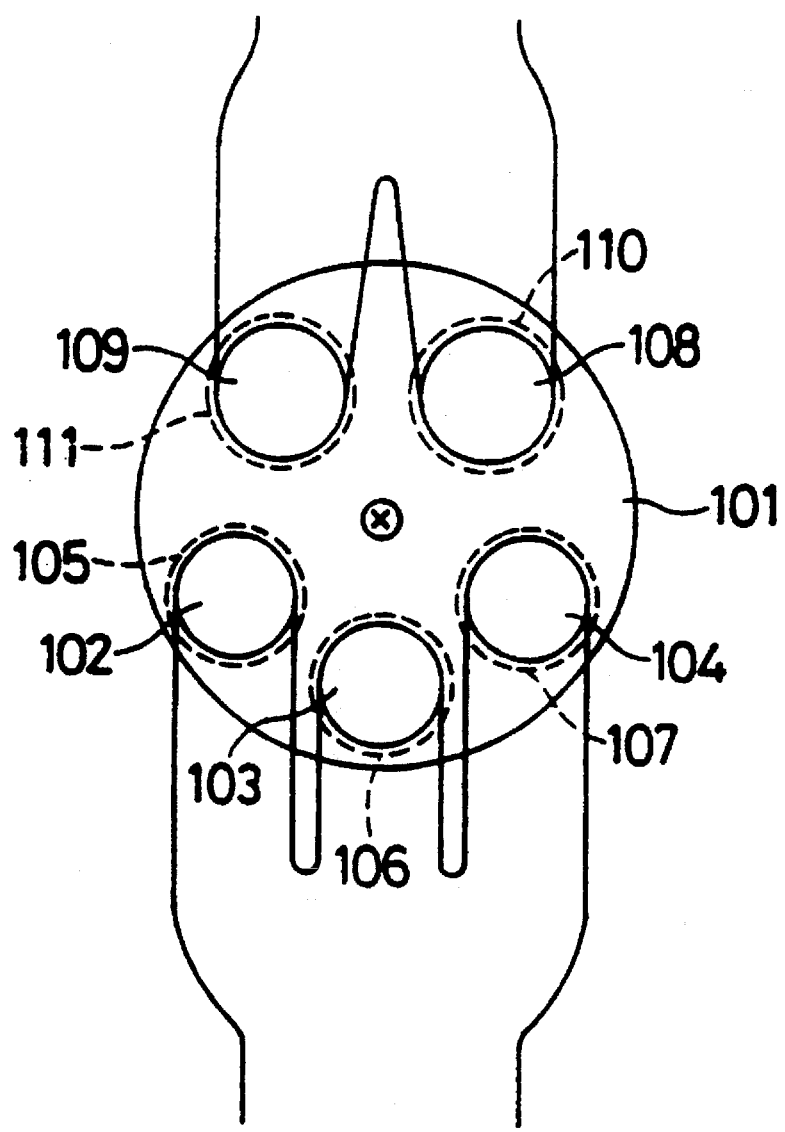
FIG. 20 is a schematic plan view showing the spark ignition type reciprocating engine with three intake valves and two exhaust valves, according to an embodiment of the present invention.

FIG. 20 shows an example of an engine having three intake valves and two exhaust valves; reference numeral 101 stands for a combustion chamber; reference numerals 102, 103 and 104 for intake ports; reference numerals 105, 106 and 107 for intake valves; reference numerals 108 and 109 for exhaust ports; reference numerals 110 and 111 for exhaust valves; and reference numeral 112 for an ignition plug.

As described hereinabove, the spark ignition type reciprocating engine according to the present invention can make the bore size smaller with respect to the volume of the single chamber, thereby suppressing the knocking from occurring and setting the compression ratio larger than the conventional ones. Further, the engine according to the present invention has a longer stroke, so that it can reduce a burden to be imposed on the bearing section of the crank shaft.

The present invention is not intended in any manner to be limited to the embodiments as described hereinabove, and it is to be understood that any variations or modifications made so as not to deviate from the basic concepts of the present invention are interpreted as being contained within the spirit of the present invention.

What is claimed is:

1. A spark ignition type reciprocating engine of a natural intake type system with an ignition plug disposed to face a combustion chamber defined and delimited by a piston inserted into a cylinder so as to move in a reciprocating way, further comprising:

means for reducing an effective compression ratio of the engine in a region where a load on the engine is relatively low so as to make the effective compression ratio lower than in a region where a load on the engine is relatively high;

wherein a ratio of a stroke of the piston to a bore size of the cylinder is chosen to be larger than 1 so that knocking in the engine tends not to occur in the region where the load on the engine is relatively high; and wherein the engine has a compression ratio of at least 11.

2. A spark ignition type reciprocating engine as claimed in claim 1, wherein the bore size is relatively small.

3. A spark ignition type reciprocating engine as claimed in claim 2, wherein the bore size is 70 mm or less.

4. A spark ignition type reciprocating engine as claimed in claim 1, wherein said means for reducing an effective compression ratio comprises a valve timing change-over mechanism for changing a timing of closing an intake valve of the combustion chamber.

5. A spark ignition type reciprocating engine as claimed in claim 2, wherein said means for reducing an effective compression ratio comprises a valve timing change-over mechanism for changing a timing of closing an intake valve of the combustion chamber.

6. A spark ignition type reciprocating engine as claimed in claim 3, wherein said means for reducing an effective compression ratio comprises a valve timing change-over mechanism for changing a timing of closing an intake valve of the combustion chamber.

7. A spark ignition type reciprocating engine as claimed in claim 4, wherein said valve timing change-over mechanism is further operable to change an overlap of an open state of the intake valve with an open state of an exhaust valve of the combustion chamber in accordance with a running state of the engine.

8. A spark ignition type reciprocating engine as claimed in claim 5, wherein said valve timing change-over mechanism is further operable to change an overlap of an open state of the intake valve with an open state of an exhaust valve of the combustion chamber in accordance with a running state of the engine.

9. A spark ignition type reciprocating engine as claimed in claim 4, wherein said valve timing change-over mechanism is operable to close the intake valve relatively later when a load on the engine is relatively low and to close the intake valve relatively sooner when the load on the engine is relatively high.

10. A spark ignition type reciprocating engine as claimed in claim 7, wherein said valve timing change-over mechanism is operable to close the intake valve relatively later when a load on the engine is relatively low and to close the intake valve relatively sooner when the load on the engine is relatively high.

11. A spark ignition type reciprocating engine as claimed in claim 1, wherein said means for reducing an effective compression ratio of the engine reduces a pumping loss of the engine when the load on the engine is relatively low by reducing the effective compression ratio of the engine in the region where the load on the engine is relatively low.

12. A spark ignition type reciprocating engine as claimed in claim 1, wherein the means for reducing the effective compression ratio of the engine, the ratio of the stroke of the piston to the bore size of the cylinder being larger than 1 and the compression ratio of the engine being at least 11 together ensure that the engine effectively converts combustion energy to engine power as the load on the engine varies from being relatively low to relatively high.

13. A method of configuring a spark ignition type reciprocating engine having a natural intake type system with an ignition plug disposed to face a combustion chamber defined and delimited by a piston inserted into a cylinder so as to move in a reciprocating way, the method comprising:

including in the engine means for reducing an effective compression ratio of the engine when a load on the engine is relatively low so as to make the effective compression ratio lower than when the load on the engine is relatively high;

reducing knocking in the engine when the load on the engine is relatively high by configuring a stroke of the piston and a bore size of the cylinder so that a ratio of the stroke of the piston to the bore size of the cylinder is larger than 1; and configuring the engine to have a compression ratio of at least 11.

14. The method of claim 13, further comprising configuring the bore size to be 70 mm or less.

15. The method of claim 13, further comprising configuring the means for reducing an effective compression ratio as a valve timing change-over mechanism operable to change a timing of closing an intake valve of the combustion chamber.

16. The method of claim 15, further comprising configuring the valve timing change-over mechanism to change an overlap of an open state of the intake valve with an open state of an exhaust valve of the combustion chamber in accordance with a running state of the engine.

17. The method of claim 15, further comprising configuring the valve timing change-over mechanism to close the intake valve relatively later when a load on the engine is relatively low and to close the intake valve relatively sooner when the load on the engine is relatively high.

* * * * *